US011790926B2

(12) United States Patent
Lee et al.

(10) Patent No.: US 11,790,926 B2
(45) Date of Patent: *Oct. 17, 2023

(54) METHOD AND APPARATUS FOR PROCESSING AUDIO SIGNAL

(71) Applicants: Electronics and Telecommunications Research Institute, Daejeon (KR); The Trustees of Indiana University, Indianapolis, IN (US)

(72) Inventors: Mi Suk Lee, Daejeon (KR); Seung Kwon Beack, Daejeon (KR); Jongmo Sung, Daejeon (KR); Tae Jin Lee, Daejeon (KR); Jin Soo Choi, Daejeon (KR); Minje Kim, Bloomington, IN (US); Kai Zhen, Bloomington, IN (US)

(73) Assignees: Electronics and Telecommunications Research Institute, Daejeon (KR); The Trustees of Indiana University, Indianapolis, IN (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/156,006

(22) Filed: Jan. 22, 2021

(65) Prior Publication Data

US 2021/0233547 A1 Jul. 29, 2021

Related U.S. Application Data

(60) Provisional application No. 62/966,917, filed on Jan. 28, 2020.

(30) Foreign Application Priority Data

May 12, 2020 (KR) .......................... 10-2020-0056492

(51) Int. Cl.
*G10L 19/038* (2013.01)
*G10L 19/028* (2013.01)
(Continued)

(52) U.S. Cl.
CPC .......... *G10L 19/038* (2013.01); *G10L 19/028* (2013.01); *G10L 25/18* (2013.01); *G10L 25/21* (2013.01); *G10L 25/30* (2013.01)

(58) Field of Classification Search
CPC ..... G10L 19/00; G10L 19/028; G10L 19/038; G06N 3/08
See application file for complete search history.

(56) References Cited

U.S. PATENT DOCUMENTS 7,605,722 B2 10/2009 Beack et al.
10,332,526 B2 6/2019 Beack et al.
(Continued)

FOREIGN PATENT DOCUMENTS

KR 1020190060628 A 6/2019
WO 2019199995 A1 10/2019

OTHER PUBLICATIONS

Zhen, Kai, et al. "On psychoacoustically weighted cost functions towards resource-efficient deep neural networks for speech denoising." arXiv preprint arXiv:1801.09774 (2018).*
(Continued)

*Primary Examiner* — Paras D Shah
(74) *Attorney, Agent, or Firm* — William Park & Associates Ltd.

(57) ABSTRACT

A method and apparatus for processing an audio signal are disclosed. According to an example embodiment, a method of processing an audio signal may include acquiring a final audio signal for an initial audio signal using a plurality of neural network models generating output audio signals by encoding and decoding input audio signals, calculating a difference between the initial audio signal and the final audio signal in a time domain, converting the initial audio signal and the final audio signal into Mel-spectra, calculating a difference between the Mel-spectra of the initial audio signal and the final audio signal in a frequency domain, training the (Continued)

plurality of neural network models based on results calculated in the time domain and the frequency domain, and generating a new final audio signal distinguished from the final audio signal from the initial audio signal using the trained neural network models.

3 Claims, 6 Drawing Sheets

(51) Int. Cl.
    *G10L 25/18*     (2013.01)
    *G10L 25/21*     (2013.01)
    *G10L 25/30*     (2013.01)

(56) References Cited

U.S. PATENT DOCUMENTS

2019/0164052 A1* 5/2019 Sung ............... G10L 19/032
2021/0082444 A1* 3/2021 Fejgin ............... G06N 3/084

OTHER PUBLICATIONS

Srihari Kankanahalli, End-to-end optimized speech coding with deep neural networks, 2018 IEEE International Conference on Acoustics, Speech and Signal Processing (ICASSP), Calgary, AB, Canada, Apr. 15-20, 2018, Institute of Electrical and Electronics Engineers, pp. 2521-2525.

Qingju Liu et al., A Perceptually-Weighted Deep Neural Network for Monaural Speech Enhancement in Various Background Noise Conditions, 25th European Signal Processing Conference (EUSIPCO) 2017, Aug. 28, 2017.

Kai Zhen et al., Cascaded Cross-Module Residual Learning Towards Lightweight End-to-End Speech Coding, in Proc. Annu. Conf. Int. Speech Commun. Assoc. 2019., Sep. 13, 2019.

Kai Zhen et al., Psychoacoustic calibration of loss functions for efficient end-to-end neural audio coding. IEEE Signal Processing Letters, Dec. 20, 2020, pp. 2159-2163.

* cited by examiner

METHOD AND APPARATUS FOR PROCESSING AUDIO SIGNAL

CROSS-REFERENCE TO RELATED APPLICATION(S)

This application claims the benefit under 35 U.S.C. § 119(e) of U.S. Provisional Application No. 62/966,917 filed on Jan. 28, 2020, in the U.S. Patent and Trademark Office, and claims the benefit under 35 U.S.C. § 119(a) of Korean Patent Application No. 10-2020-0056492 filed on May 12, 2020, in the Korean Intellectual Property Office, the entire disclosures of which are incorporated herein by reference.

BACKGROUND

1. Field of the Invention

The present disclosure relates to a method and apparatus for processing an audio signal, and more particularly, to a method and apparatus for processing an audio signal by calculating a loss function for training a neural network model using a psychoacoustic model when training a neural network model that encodes and decodes an audio signal.

2. Description of the Related Art

In an audio signal processing process in which an audio signal is encoded and then decoded to be restored, a difference between an initial input audio signal and a restored audio signal may occur due to a loss of the audio signal.

To reduce the loss of the audio signal, studies on neural audio coding that applies a neural network model to encoding and decoding of an audio signal are actively conducted in deep learning which is one of artificial intelligent technologies for encoding and decoding an audio signal. Accordingly, there is a desire for a technique for training neural network models based on psychoacoustic factors to minimize a loss of an audio signal.

SUMMARY

An aspect provides a method and apparatus for minimizing a loss of an audio signal using a psychoacoustic model in a process of training a neural network model when processing an audio signal using a neural network model that encodes and decodes an audio signal.

Another aspect provides a method and apparatus for increasing a quality of a restored audio signal by training a neural network model to minimize noise generated in an encoding process of an audio signal while training a neural network model that encodes and decodes an audio signal.

According to an aspect, there is provided a processing method including acquiring a final audio signal for an initial audio signal using a plurality of neural network models generating output audio signals by encoding and decoding input audio signals, calculating a difference between the initial audio signal and the final audio signal in a time domain, converting the initial audio signal and the final audio signal into Mel-spectra, calculating a difference between the Mel-spectra of the initial audio signal and the final audio signal in a frequency domain, training the plurality of neural network models based on results calculated in the time domain and the frequency domain, and generating a new final audio signal distinguished from the final audio signal from the initial audio signal using the trained neural network models.

The training of the neural network models may include updating parameters included in the neural network models such that a sum of the result calculated in the time domain and the result calculated in the frequency domain is minimized.

The plurality of neural network models may be in a consecutive relationship, where an i-th neural network model may generate an output audio signal using, as an input audio signal, a difference between an output audio signal of an (i−1)-th neural network model and an input audio signal of the (i−1)-th neural network model.

The final audio signal may be an audio signal corresponding to a sum of the output audio signals of the plurality of neural network models.

According to another aspect, there is also provided a processing method including acquiring a final audio signal for an initial audio signal using a plurality of neural network models generating output audio signals by encoding and decoding input audio signals, acquiring a masking threshold and a power spectral density for the initial audio signal through a psychoacoustic model, determining a weight based on a relationship between the masking threshold and the power spectral density for each frequency, calculating a difference between a power spectral density of the initial audio signal and a power spectral density of the final audio signal for each frequency based on the determined weight, training the neural network models based on a result of the calculating, and generating a new final audio signal distinguished from the final audio signal from the initial audio signal using the trained neural network models.

The training of the neural network models may include updating parameters included in the neural network models such that the result of the calculating is minimized.

The masking threshold may be a criterion for masking noise generated in an encoding and decoding process of the neural network models in consideration of a sound pressure level of the initial audio signal determined based on the psychoacoustic model.

The determining of the weight may include determining the weight to be higher at a specific frequency as the power spectral density of the initial audio signal compared to the masking threshold increases, and determining the weight to the lower at the specific frequency as the masking threshold compared to the power spectral density of the initial audio signal increases.

According to another aspect, there is also provided a processing method including acquiring a final audio signal for an initial audio signal using a plurality of neural network models generating output audio signals by encoding and decoding input audio signals, acquiring a masking threshold for the initial audio signal through a psychoacoustic model, identifying noise generated in an encoding and decoding process of the initial audio signal from the final audio signal, calculating a difference between noise included in the final audio signal and the masking threshold for each frequency, training the neural network models based on a result of the calculating, and generating a new final audio signal distinguished from the final audio signal from the initial audio signal using the trained neural network models.

The training of the neural network models may include updating parameters included in the neural network models such that the result of the calculating is minimized.

The masking threshold may be a criterion for masking noise generated in an encoding and decoding process of the neural network models in consideration of a sound pressure level of the initial audio signal determined based on the psychoacoustic model.

According to another aspect, there is also provided a processing method of an audio signal, the processing method including acquiring a final audio signal for an initial audio signal using a plurality of neural network model generating output audio signals by encoding and decoding input audio signals, calculating a difference between the initial audio signal and the final audio signal using a first loss function for calculating a difference between the initial audio signal and the final audio signal in a time domain and a second loss function for calculating a difference between Mel-spectra of the initial audio signal and the final audio signal in a frequency domain, determining a masking threshold and a power spectrum density of the initial audio signal using a psychoacoustic model, calculating a difference between the initial audio signal and the final audio signal through a third loss function for calculating a difference between the initial audio signal and the final audio signal in the frequency domain based on a relationship between the masking threshold and the power spectrum density of the initial signal, updating parameters included in the plurality of neural network models based on results calculated through the first to third loss functions, and generating a new final audio signal distinguished from the final audio signal from the initial audio signal using the neural network models in which the parameters are updated.

The masking threshold may mask noise generated in an encoding and decoding process of the neural network models in consideration of a sound pressure level of the initial audio signal determined based on the psychoacoustic model.

The calculating of the difference between the initial audio signal and the final audio signal using the third loss function may include determining a weight based on the relationship between the masking threshold and the power spectrum density for each frequency, and calculating a difference between the power spectrum density of the initial audio signal and a power spectrum density of the final audio signal for each frequency through the third loss function based on the determined weight.

The determining of the weight may include determining the weight to be higher at a specific frequency as the power spectral density of the initial audio signal compared to the masking threshold increases, and determining the weight to the lower at the specific frequency as the masking threshold compared to the power spectral density of the initial audio signal increases.

According to another aspect, there is also provided a processing method of an audio signal, the processing method including: a) acquiring a final audio signal for an initial audio signal using a plurality of neural network models generating output audio signals by encoding and decoding input audio signals; b) calculating a difference between the initial audio signal and the final audio signal in a time domain; c) calculating a difference between Mel-spectra of the initial audio signal and the final audio signal in a frequency domain; d) determining a masking threshold using a psychoacoustic model; e) calculating a difference between the masking threshold of the initial audio signal and noise of the final audio signal determined through the psychoacoustic model; updating parameters included in the plurality of neural network models based on results calculated in b), c), and d); and generating a new final audio signal distinguished from the final audio signal from the initial audio signal using the neural network models in which the parameters are updated.

The masking threshold may be a criterion for masking noise generated in an encoding and decoding process of the neural network models in consideration of a sound pressure level of the initial audio signal determined based on the psychoacoustic model.

According to another aspect, there is also provided a processing method of an audio signal, the processing method including: acquiring a final audio signal for an initial audio signal using a plurality of neural network models generating output audio signals by encoding and decoding input audio signals; training the plurality of neural network models using i) a first loss function for calculating a difference between the initial audio signal and the final audio signal in a time domain, ii) a second loss function for calculating a difference between Mel-spectra of the initial audio signal and the final audio signal in a frequency domain, iii) a third loss function for calculating a difference between the initial audio signal and the final audio signal in the frequency domain based on a relationship between the masking threshold and the power spectrum density of the initial signal, and iv) a fourth loss function or calculating a difference between the masking threshold of the initial audio signal and noise included in the final audio signal determined through the psychoacoustic model; and generating a new final audio signal distinguished from the final audio signal from the initial audio signal using the trained neural network models.

According to another aspect, there is also provided an apparatus for processing an audio signal, the apparatus including a processor, wherein the processor is configured to: acquire a final audio signal for an initial audio signal using a plurality of neural network models generating output audio signals by encoding and decoding input audio signals; train the plurality of neural network models using i) a first loss function for calculating a difference between the initial audio signal and the final audio signal in a time domain, ii) a second loss function for calculating a difference between Mel-spectra of the initial audio signal and the final audio signal in a frequency domain, iii) a third loss function for calculating a difference between the initial audio signal and the final audio signal in the frequency domain based on a relationship between the masking threshold and the power spectrum density of the initial signal, and iv) a fourth loss function or calculating a difference between the masking threshold of the initial audio signal and noise included in the final audio signal determined through the psychoacoustic model; and generate a new final audio signal distinguished from the final audio signal from the initial audio signal using the trained neural network models.

According to another aspect, there is also provided an apparatus for processing an audio signal, the apparatus including a processor, wherein the processor is configured to: acquire a final audio signal for an initial audio signal using a plurality of neural network models generating output audio signals by encoding and decoding input audio signals: calculate a difference between the initial audio signal and the final audio signal using at least one loss function among i) a first loss function for calculating a difference between the initial audio signal and the final audio signal in a time domain, ii) a second loss function for calculating a difference between Mel-spectra of the initial audio signal and the final audio signal in a frequency domain, iii) a third loss function for calculating a difference between the initial audio signal and the final audio signal in the frequency domain based on a relationship between the masking threshold and the power spectrum density of the initial signal, and iv) a fourth loss function or calculating a difference between the masking threshold of the initial audio signal and noise included in the final audio signal determined through the psychoacoustic model, train the plurality of neural network models based on a result of the calculating; and generate a new final audio signal distinguished from the final audio signal from the initial audio signal using the trained neural network models.

According to example embodiments, it is possible to minimize a loss of an audio signal using a psychoacoustic model in a process of training a neural network model when processing an audio signal using a neural network model that encodes and decodes an audio signal.

According to example embodiments, it is possible to increase a quality of a restored audio signal by training a neural network model to minimize noise generated in an encoding process of an audio signal while training a neural network model that encodes and decodes an audio signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
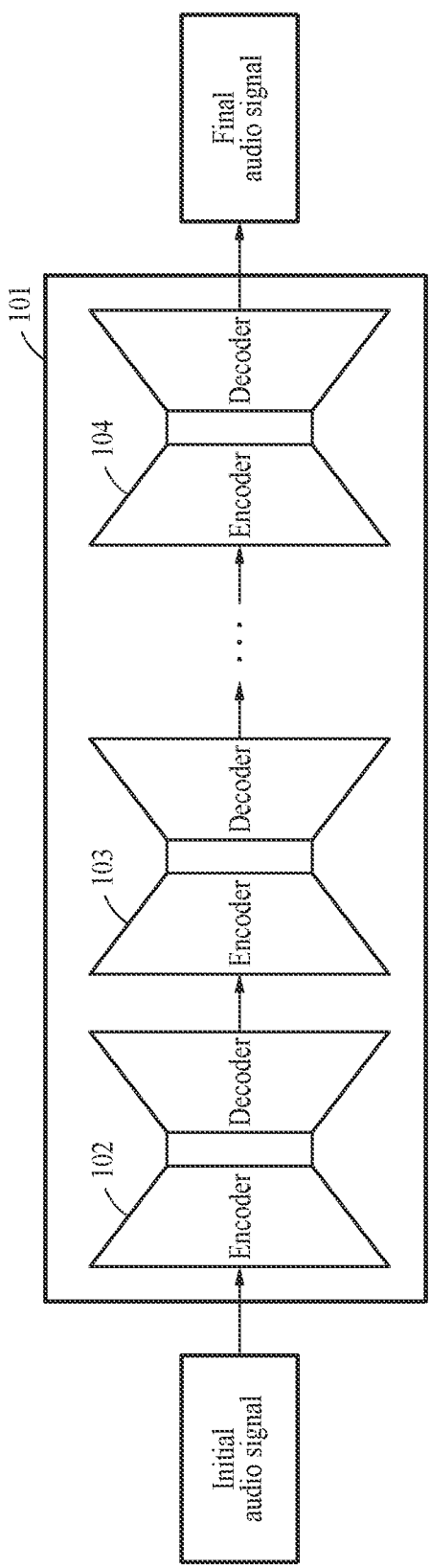
FIG. 1 is a diagram illustrating a structure of an audio signal processing apparatus according to an example embodiment of the present disclosure.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a structure of an audio signal processing apparatus according to an example embodiment of the present disclosure.

In the present disclosure, in order to reduce a loss of an audio signal occurring in a process of encoding and decoding the audio signal, when training a neural network model that encodes and decodes the audio signal, a loss function using a psychoacoustic model (PAM) may be applied to train the neural network model, thereby processing the audio signal.

An audio signal processing apparatus (hereinafter, referred to as a "processing apparatus") of the present disclosure may include a processor. The processor included in the processing apparatus may perform an audio signal processing method. In the present disclosure, "encoding" may refer to a process of converting an audio signal into a code vector, and "decoding" may refer to a process of restoring an audio signal from a code vector.

Here, an audio signal is, in a broad sense, a concept distinguished from a video signal and refers to a signal that can be identified by hearing during playback and is, in a narrow sense, a concept distinguished from a speech signal and refers to a signal having no or little speech characteristics. In the present disclosure, an audio signal should be interpreted in a broad sense, and when used separately from a speech signal, may be understood as an audio signal in a narrow sense.

Referring to FIG. 1, a plurality of neural network models 102 through 104 may be implemented in a processing apparatus. The neural network models 102 through 104 may generate code vectors by encoding input audio signals and quantize the code vectors. In addition, the neural network models 102 through 104 may generate output audio signals to which the input audio signals are restored by decoding the quantized code vectors.

Referring to FIG. 1, the processing apparatus may acquire a final audio signal using the consecutive neural network models 102 through 104 based on an initial audio signal. Specifically, the plurality of neural network models 102 through 104 may be in a consecutive relationship. For example, an i-th neural network model may generate an output audio signal using, as an input audio signal, a difference between an output audio signal of an (i−1)-th neural network model and an input audio signal of the (i−1)-th neural network model.

For example, a first neural network model (e.g., the neural network model 102) may generate an output audio signal using an initial audio signal of the processing apparatus as an input audio signal. A second neural network model (e.g., the neural network model 103) may generate an output audio signal using a difference between the initial audio signal and the output audio signal of the first neural network model as an input audio signal.

When N neural network models are provided, an N-th neural network model (e.g., the neural network model 104) may generate an output audio signal using a difference between an input audio signal and an output audio signal of an (N−1)-th neural network model as an input audio signal. Accordingly, the final audio signal of the initial audio signal input to the processing apparatus may correspond to an audio signal obtained by aggregating the output audio signals of the plurality of neural network models 102 through 104.

The neural network models 102 through 104 may include a plurality of layers including parameters. In the present disclosure, a neural network model may correspond to an autoencoder implemented as a convolutional neural network (CNN). However, it is merely an example, and the neural network model of the present disclosure may be implemented in various forms. A structure of the neural network model is described in greater detail with reference to FIGS. 2A and 2B.

The neural network model may be trained to reduce a difference between the final audio signal and the initial audio signal. Specifically, the processing apparatus may update parameters included in the plurality of neural network models to minimize a result of a loss function for calculating a difference between the final audio signal and the initial audio signal. That is, the loss function may be used as a criterion for training the neural network model.

The processing apparatus may determine a difference between the final audio signal and the initial audio signal by inputting differences between the input audio signals and the output audio signals of the plurality of neural network models into the loss function.

When calculating differences between the input audio signals and the output audio signals of the plurality of neural network models through the loss function, the processing apparatus may use at least one loss function among a first loss function for a time domain, a second loss function for a frequency domain, a third loss function based on a relationship between a masking threshold and a power spectral density of the initial audio signal according to a psychoacoustic model, and a fourth loss function based on a relationship between noise generated in a quantization process and the masking threshold based on a psychoacoustic model.

As an example, the processing apparatus may calculate differences between the input audio signals and the output audio signals of the plurality of neural network models in a time domain through the first loss function and obtain a sum of calculation results of the neural network models, thereby determining a difference between the final audio signal and the initial audio signal.

As another example, the processing apparatus may convert the input audio signals and the output audio signals of the plurality of neural network models into Mel-spectra, calculate differences between the input audio signal and the output audio signal converted through the second loss function in a frequency domain, and obtain a sum of calculation results of the neural network models, thereby determining a difference between the final audio signal and the initial audio signal.

As still another example, the processing apparatus may acquire a masking threshold of the initial audio signal through the psychoacoustic model. In addition, the processing apparatus may acquire a power spectral density (PSD) of the initial audio signal through the psychoacoustic model.

In this example, the masking threshold is based on psychoacoustic theory. Also, the masking threshold is a criterion for masking noise generated in a quantization process of each neural network model by using a characteristic that small audio signals adjacent to a large audio signal are not recognized well in a human auditory structure.

Therefore, when generating the final audio signal, the processing apparatus may mask noise by canceling noise having a lower sound pressure level than the masking threshold for each frequency based on a sound pressure level of the initial audio signal determined through the psychoacoustic model.

The processing apparatus may calculate a difference between the initial audio signal and the final audio signal in a frequency band based on a relationship between the masking threshold and the power spectral density of the initial audio signal for each frequency determined by the psychoacoustic model through the third loss function and obtain a sum of calculation results of the neural network models, thereby determining a difference between the final audio signal and the initial audio signal.

Here, the psychoacoustic model (PAM) may be model based on the psychoacoustic theory and used for calculating a masking effect by generating a power spectral density for each frequency with respect to the initial audio signal and determining a masking threshold according to the generated power spectral density. The power spectral density may indicate an energy or power density distribution of an audio signal in a frequency domain of the audio signal.

As yet another example, the processing apparatus may calculate a difference between the masking threshold of the initial audio signal determined through the psychoacoustic model and noise of the final audio signal using the fourth loss function in a frequency band and obtain a sum of calculation results of the neural network models, thereby determining a difference between the final audio signal and the initial audio signal.

A calculation method of the third loss function and the fourth loss function is described in greater detail with reference to FIG. 3.

The processing apparatus may determine a difference between the final audio signal and the initial audio signal using at least one loss function among the first to fourth loss functions. The processing apparatus may update the parameters included in the plurality of neural network models to minimize the difference between the final audio signal and the initial audio signal calculated using at least one loss function among the first to fourth loss functions.

The processing apparatus may acquire the final audio signal by processing the initial audio signal using the plurality of neural network models updated.

Figure 2A:
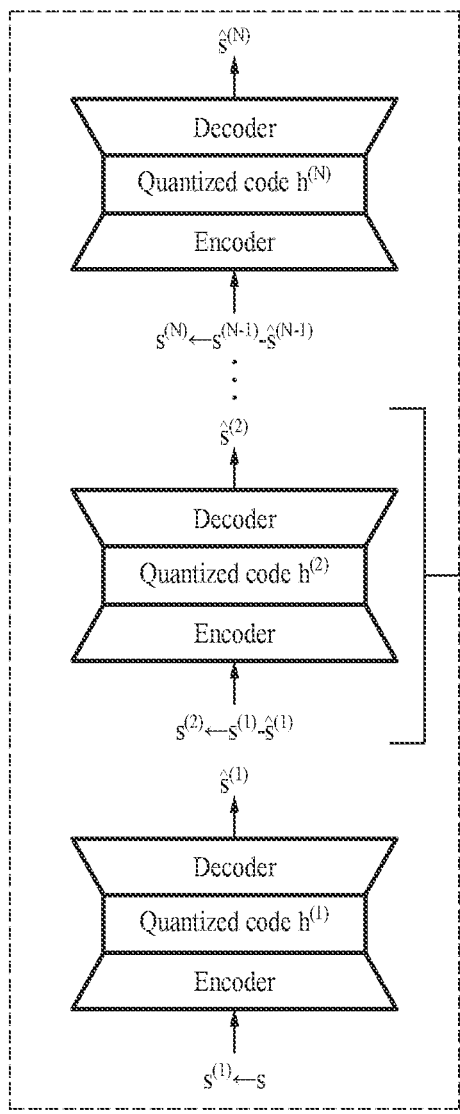
FIGS. 2A and 2B are diagrams illustrating a relationship between neural network models and a structure of a neural network model according to an example embodiment of the present disclosure.
Figure 2B:
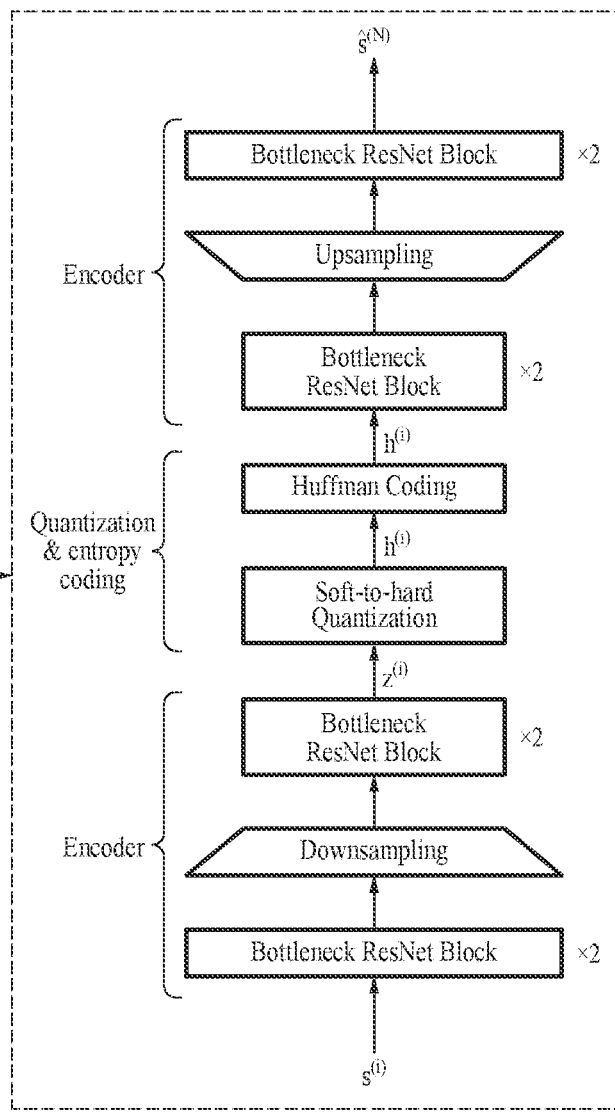

FIGS. 2A and 2B are diagrams illustrating a relationship between neural network models and a structure of a neural network model according to an example embodiment of the present disclosure.

FIG. 2A is a diagram illustrating a relationship of a plurality of neural network models used in the present disclosure. FIG. 2B is a diagram illustrating a structure of one neural network model.

In FIGS. 2A and 2B, s denotes an initial audio signal and $s^{(i)}$ denotes an input audio signal of an i-th neural network model. In addition, $\hat{s}^{(i)}$ denotes an output audio signal of the i-th neural network model. As shown in FIG. 2A, the i-th neural network model may generate the output audio signal $\hat{s}^{(i)}$ by receiving a difference (e.g., $s^{(i-1)}-\hat{s}^{(i-1)}$) between an input audio signal and an output audio signal of an (i−1)-th neural network model as an input audio signal.

Each neural network model (e.g., $s^{(i)}$) may include an encoder that performs encoding, a code (e.g., $h^{(i)}$) obtained by quantizing a code vector generated by encoding an input audio signal, and a decoder that performs decoding. The encoder and the decoder may correspond to layers included in the corresponding neural network model.

Referring to FIG. 2B, an encoder of a neural network model generates a code vector by encoding an input audio signal in units of frames. For example, as illustrated in FIG. 2B, Bottleneck ResNet Blocks to which ResNet, a classification model using CNN, is applied to the encoder of the neural network model may be used.

The neural network model may generate a quantized code $h^{(i)}$ by quantizing and entropy coding a code vector $z^{(i)}$ generated through the encoder. A decoder of the neural network model may generate an output audio signal S obtained by restoring an input audio signal $s^{(i)}$ using the quantized code $h^{(i)}$. Like the encoder, the decoder may also use Bottleneck ResNet Blocks to which ResNet is applied. However, a model used in the neural network model is not limited to ResNet.

For example, the neural network model to which ResNet is applied may perform encoding and decoding of an input audio signal based on a value shown in Table 1 below.

ing output audio signals of the neural network models, a processing apparatus may input differences between the input audio signals and the output audio signals of the neural network models into a loss function 302.

The processing apparatus may update parameters included in each of the neural network models using a sum 301 of differences between the input audio signals and the output audio signals of the neural network models. Through a process 307, the processing apparatus may generate a final audio signal for an initial audio signal while updating the parameters to minimize a result of the loss function 302. Also, the processing apparatus may acquire a final audio signal for an initial audio signal using a neural network model including a parameter that minimizes a result of the loss function 302.

As such, the processing apparatus may train the plurality of neural network models by updating the parameters to minimize the result of the loss function 302. Neural network models including the parameter that minimizes the result of the loss function 302 may correspond to trained neural network models.

The loss function 302 may include a first loss function 303 for a time domain, a second loss function 304 for a frequency domain, a third loss function 305 based on a relationship between a masking threshold and a power spectral density of the initial audio signal according to a psychoacoustic model, and a fourth loss function 306 based on a relationship between noise generated in a quantization process and the masking threshold according to the psychoacoustic model.

For example, the processing apparatus may acquire a result of the loss function 302 with respect to a difference

TABLE 1

| System | Layer | Input shape | Kernel shape | | Output shape |
|---|---|---|---|---|---|
| Encoder | Change channel | (512, 1) | (9, 1, 100) | | (512, 100) |
| | 1st bottleneck | (512, 100) | (9, 100, 20) (9, 20, 20) (9, 20, 100) | ×2 | (512, 100) |
| | Downsampling | (512, 100) | (9, 100, 100) | | (256, 100) |
| | 2nd bottleneck | (256, 100) | (9, 100, 20) (9, 20, 20) (9, 20, 100) | ×2 | (256, 100) |
| | Change channel | (256, 100) | (9, 100, 1) | | (256, 1) |
| | Soft-to-hard quantization & Huffman coding | | | | |
| | Change channel | (256, 1) | (9, 1, 100) | | (256, 100) |
| | 1st bottleneck | (256, 100) | (9, 100, 20) (9, 20, 20) (9, 20, 100) | ×2 | (256, 100) |
| Decoder | Upsampling | (256, 100) | (9, 100, 100) | | (512, 50) |
| | 2nd bottleneck | (522, 50) | (9, 50, 20) (9, 20, 20) (9, 20, 50) | ×2 | (512, 50) |
| | Change channel | (512, 50) | (9, 50, 1) | | (512, 1) |

In Table 1, an input shape and an output shape for each layer of the neural network model indicate (frame length, channel), and a kernel shape indicates (kernel size, in-channel, out-channel).

Figure 3:
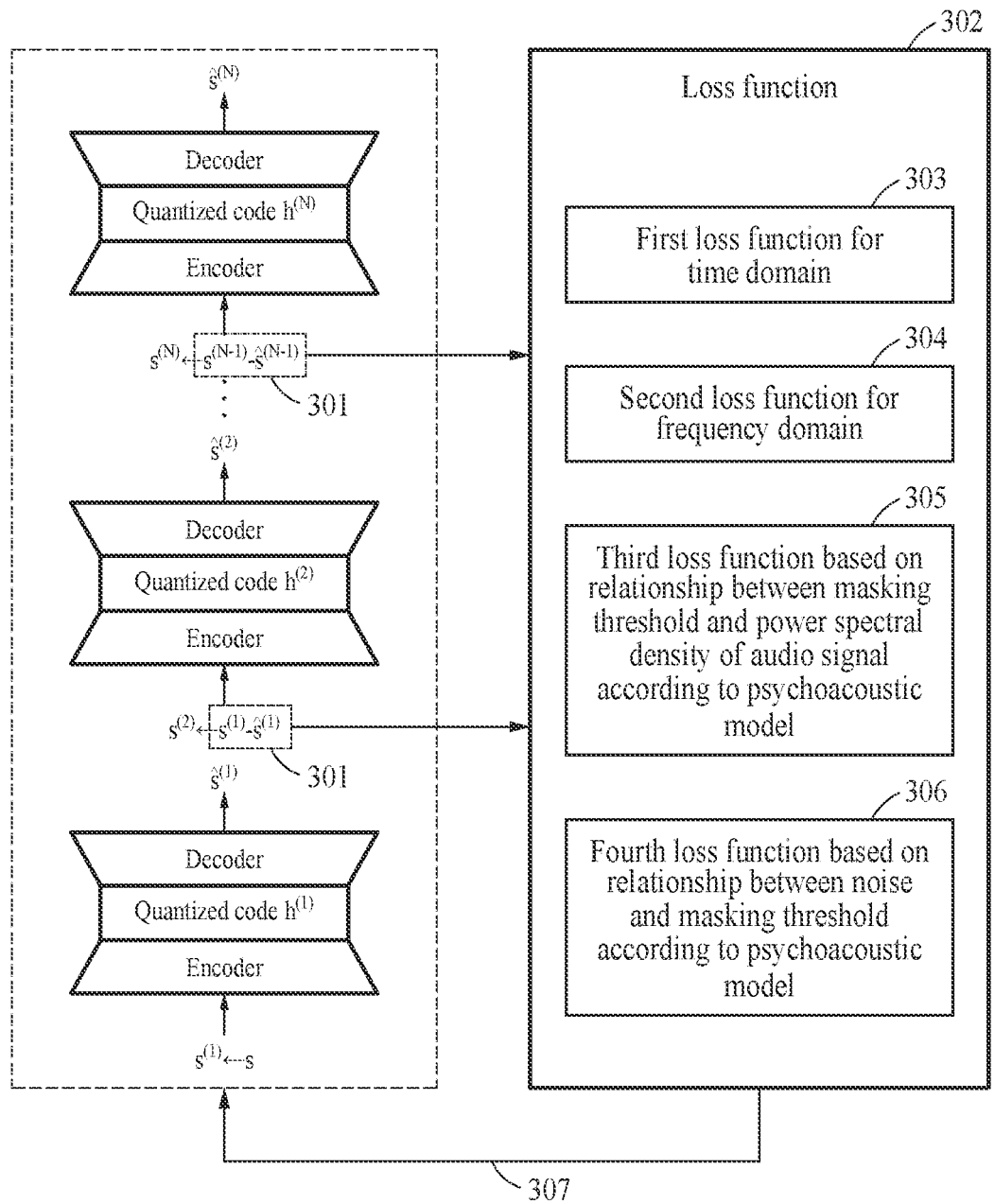
FIG. 3 is a diagram illustrating a structure of a loss function for calculating a difference between an initial audio signal and a final audio final generated using neural network models according to an example embodiment of the present disclosure.

FIG. 3 is a diagram illustrating a structure of a loss function for calculating a difference between an initial audio signal and a final audio final generated using neural network models according to an example embodiment of the present disclosure.

Referring to FIG. 3, when acquiring a final audio signal ($=\hat{s}^{(1)}+\hat{s}^{(2)}+ \ldots +\hat{s}^{(N)}$) by processing initial audio signal(s) through a plurality of neural network models and aggregatbetween the initial audio signal and the final audio signal using at least one of the first loss function 303 to the fourth loss function 306. The loss function 302 using at least one of the first loss function 303 to the fourth loss function 306 may be defined according to Equation 1 below.

$$\mathcal{L} = \lambda_1 \mathcal{L}_1 + \lambda_2 \mathcal{L}_2 + \lambda_3 \mathcal{L}_3 + \lambda_4 \mathcal{L}_4 \quad \text{[Equation 1]}$$

In Equation 1, $\mathcal{L}$ denotes the loss function 302 determined by the first to fourth loss functions (e.g., $\mathcal{L}1$, $\mathcal{L}2$, $\mathcal{L}3$, and $\mathcal{L}4$). Also, λ1, λ2, λ3, and λ4 are weights for determining a loss function to be used among the first to fourth loss functions $\mathcal{L}1$, $\mathcal{L}2$, $\mathcal{L}3$, and $\mathcal{L}4$ or adjusting different units of the first to fourth loss functions $\mathcal{L}1$, $\mathcal{L}2$, $\mathcal{L}3$, and $\mathcal{L}4$.

For example, if λ1, λ2, and λ3 are zero, the processing apparatus may calculate a difference between the initial audio signal and the final audio signal using the fourth loss function $\mathcal{L}4$. If each of λ1, λ2, λ3, and λ4 is greater than zero, the processing apparatus may calculate a difference between the initial audio signal and the final audio signal by obtaining a sum of results of the first to fourth loss functions $\mathcal{L}1$, $\mathcal{L}2$, $\mathcal{L}3$, and $\mathcal{L}4$ for a difference between the initial audio signal and the final audio signal.

The first loss function 303 is a loss function for calculating a difference between the initial audio signal and the final audio signal in the time domain. For example, the processing apparatus may calculate a difference between the initial audio signal and the output audio signal for the time domain by inputting differences between the input audio signals and the output audio signals of the neural network models into the first loss function 303. The first loss function 303 may calculate a difference between an input audio signal and an output audio signal according to Equation 2 below.

$$\mathcal{L}_1(s\|\hat{s}) = \sum_{i=1}^{N} \sum_{t=1}^{T} \left(\hat{s}_t^{(i)} - \bar{s}_t^{(i)}\right)^2 \quad [\text{Equation 2}]$$

In Equation 2, T denotes a period of time of a frame used as an encoding and decoding unit of the neural network model and t denotes a predetermined time of the initial audio signal. In addition, $s_t^{(i)}$ and $\hat{s}_t^{(i)}$ denote an input audio signal and an output audio signal corresponding to the predetermined time t.

Also, i denotes an i-th neural network model among N consecutive neural network models. The first loss function 303 is a function that outputs a sum of squares of differences between input audio signals and output audio signals for each time (t) in the time domain for each of the N neural network models.

In the foregoing, it can be known that the smaller the result output by the first loss function 303, the more accurately the final audio signal is restored from the initial audio signal. Thus, the processing apparatus may train neural network models such that a result of the first loss function 303 is minimized.

The second loss function 304 is a loss function for calculating a difference between Mel-spectra between the initial audio signal and the final audio signal in the frequency domain. Specifically, the processing apparatus may convert the initial audio signal and the final audio signal into Mel-spectra. Mel spectrum may be a result obtained by converting a frequency unit of the initial audio signal into a Mel-unit.

For example, the processing apparatus may calculate a difference between the initial audio signal and the output audio signal for the frequency domain by inputting a difference between Mel-spectra of the input audio signal and the output audio signal of each of the neural network models into the second loss function 304. The second loss function 304 may calculate a difference between the input audio signal and the output audio signal according to Equation 3 below.

In Equation 3, F corresponds to a frequency range of a frame used as an encoding and decoding unit of the neural network model and f corresponds to a specific resolution included in F. $y_f^{(i)}$ and $\hat{y}_f^{(i)}$ denote Mel-spectrum of the input audio signal and Mel-spectrum of the output audio signal for the specific frequency f.

i denotes the i-th neural network model among the N consecutive neural network models. The second loss function 304 is a function that outputs a sum of squares of differences between Mel-spectra of input audio signals and output audio signals for each frequency (f) for each of the N neural network models.

In the foregoing, it can be known that the smaller the result output by the second loss function 304, the more accurately the final audio signal is restored from the initial audio signal. Thus, the processing apparatus may train neural network models such that a result of the second loss function 304 is minimized.

The third loss function 305 is a loss function for calculating a difference between the initial audio signal and the final audio signal in the frequency domain based on a relationship between the masking threshold and the power spectral density of the initial audio signal determined through the psychoacoustic model.

In order to use the third loss function 305, the processing apparatus may acquire the masking threshold and the power spectral density for the initial audio signal through the psychoacoustic model. The processing apparatus may determine a weight based on a relationship between the masking threshold and the power spectral density for each frequency through the third loss function 305, and calculate a difference between a power spectral density of the initial audio signal and a power spectral density of the final audio signal for each frequency based on the determined weight.

Specifically, the processing apparatus may determine a weight indicating a relationship between the masking threshold and the power spectral density for the initial audio signal according to Equation 4 below $$w = \log_{10}\left(\frac{10^{0.1p}}{10^{0.1m}} + 1\right) \quad [\text{Equation 4}]$$

In Equation 4, ω denotes a weight indicating a relationship between the power spectral density and the masking threshold at a specific frequency. m denotes the masking threshold and p denotes the power spectral density for the initial audio signal.

According to Equation 4, at the specific frequency, the greater the power spectral density of the initial audio signal compared to the masking threshold, the more difficult the audio signal to be restored. In this case, the processing apparatus may determine the weight to be relatively high. Also, the processing apparatus may determine the weight to be smaller as the masking threshold is greater compared to the power spectral density of the initial audio signal.

In addition, the processing apparatus may calculate a difference between the power spectral density of the initial audio signal and the power spectral density of the final audio signal using a weight determined for each frequency through the third loss function 305. Specifically, the third loss function 305 may be determined according to Equation 5.

$$\mathcal{L}_2(y\|\hat{y}) = \sum_{i=1}^{N} \sum_{f=1}^{F} \left(y_f^{(i)} - \hat{y}_f^{(i)}\right)^2 \quad [\text{Equation 3}]$$

$$\mathcal{L}_3(s\|\hat{s}) = \sum_{i} \sum_{f} w_f \left(x_f^{(i)} - \hat{x}_f^{(i)}\right)^2 \quad [\text{Equation 5}]$$

In Equation 5, f denotes a specific frequency, and $x_f^{(i)}$ and $\hat{x}_f^{(i)}$ denote a power spectral density of an input audio signal and a power spectral density of an output audio signal of a neural network model. Also, $w_f$ denote a weight determined for the specific frequency.

i denotes the i-th neural network model among the N consecutive neural network models. The third loss function 305 is a function that outputs a sum of squares of differences between power spectral densities of input audio signals and output audio signals for each frequency (f) for each of the N neural network models.

Accordingly, the processing apparatus may increase a restoration rate of the initial audio signal by processing an audio signal that is difficult to be restored, with a higher weight compared to other audio signals through the third loss function 305 which is weighted according to the psychoacoustic model.

At this time, the output audio signal of the neural network model trained through the third loss function 305 may not mask large noise. To solve this, the processing apparatus may use the fourth loss function 306.

The fourth loss function 306 is a loss function for calculating a difference between the masking threshold of the initial audio signal and noise included in the final audio signal through the psychoacoustic model in a frequency band. Here, the noise may be a logarithmic PSD function for a difference between the initial audio signal and the final audio signal.

The processing apparatus may calculate a difference between the initial audio signal and the final audio signal based on the relationship between the masking threshold and the noise generated in the encoding and decoding process of the initial audio signal.

Specifically, the processing apparatus may identify, from the final audio signal, the noise generated in the encoding and decoding process of the initial audio signal and calculate a difference between the masking threshold and the noise included in the final audio signal for each frequency through the fourth loss function 306 as shown in Equation 6 below.

$$\mathcal{L}_4 = \sum_i \left( \sum_f (n_f^{(i)} - m_f^{(i)}) \right) - \min_f (m_f^{(i)} - n_f^{(i)}) \quad [\text{Equation 6}]$$

In Equation 6, $n_f^{(i)}$ and $m_f^{(i)}$ denote noise and a masking threshold, each corresponding to a specific frequency f. The processing apparatus may determine a frequency having a smallest difference between the noise and the masking threshold, thereby determining a minimum difference between the noise and the masking threshold for each neural network model. The fourth loss function 306 may output a sum obtained by calculating, for each neural network model, results of aggregating the differences between the noise and the masking threshold for each frequency excluding the determined minimum difference.

As such, the processing apparatus may update parameters of the neural network model to minimize a result of the fourth loss function 306, thereby reducing noise generated in an encoding and decoding process of the initial audio signal.

The processing apparatus may train the neural network models to minimize a result of at least one loss function among the first loss function 303 to the fourth loss function 306, thereby generating the final audio signal for the initial audio signal through the trained neural network models.

Figure 4A:
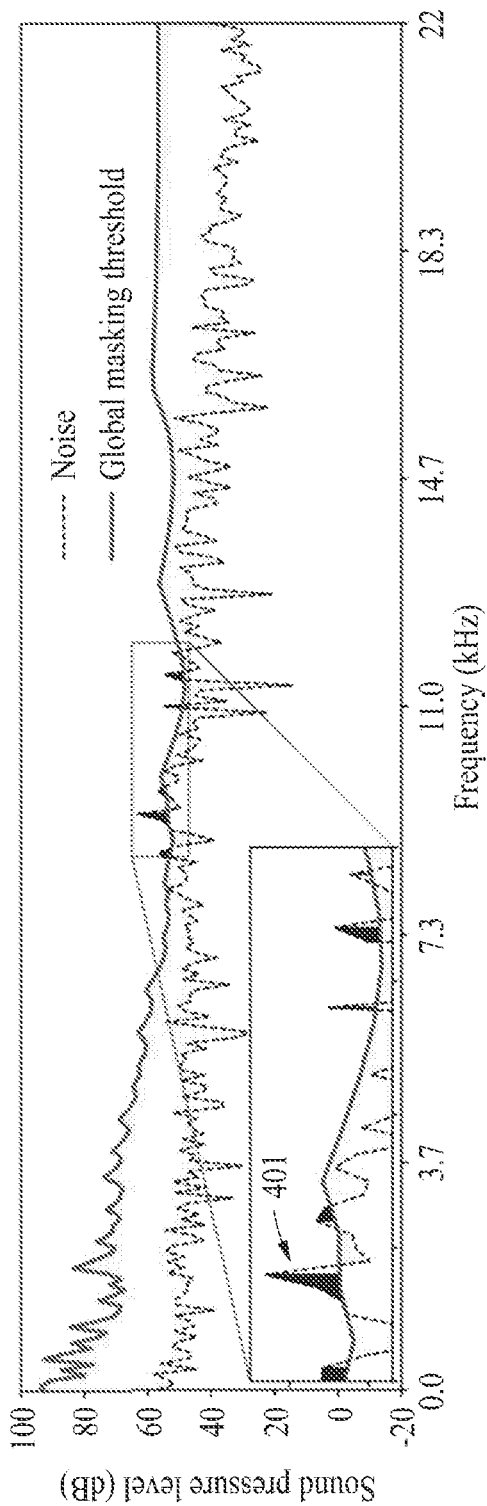
FIGS. 4A and 4B are diagrams illustrating a noise occurrence result based on whether a loss function is used according to an example embodiment of the present disclosure.
Figure 4B:
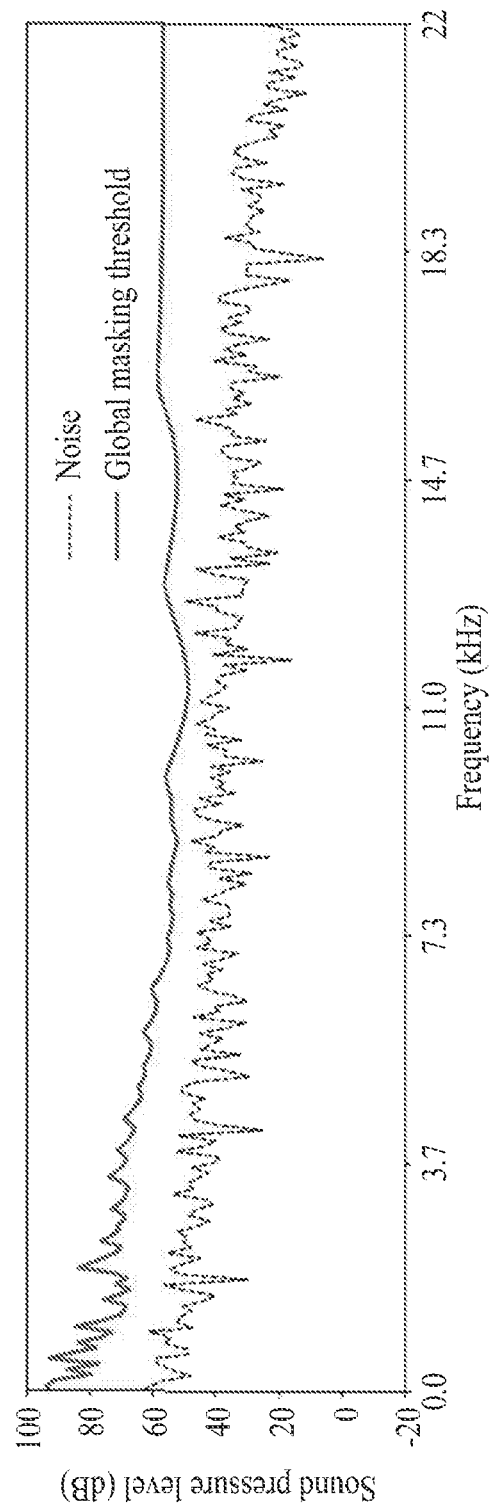

FIGS. 4A and 4B are diagrams illustrating a noise occurrence result based on whether a loss function is used according to an example embodiment of the present disclosure.

FIG. 4A is a graph showing a relationship between a masking threshold of an initial audio signal and noise of a final audio signal acquired using neural network models trained through first to third loss functions.

FIG. 4B is a graph showing a relationship between a masking threshold of an initial audio signal and noise of a final audio signal acquired using neural network models trained through first to fourth loss functions.

Specifically, FIG. 4A is based on a case in which λ1, λ2, and λ3 of Equation 1 are greater than zero and λ4 is zero. Also, FIG. 4B is based on a case in which λ1, λ2, λ3, and λ4 are greater than zero, for example, λ1=60, λ2=5, λ3=1, and λ4=5.

Referring to FIG. 4A, a section 401 shows a result that noise exceeding a masking threshold is not masked. In this case, a final audio signal may be degraded in quality due to noise that is not included in an initial audio signal.

Referring to FIG. 4B, since neural network models are trained based on a relationship between noise and a masking threshold in the fourth loss function, noise exceeding the masking threshold like the noise of FIG. 4A may not be generated.

Figure 5:
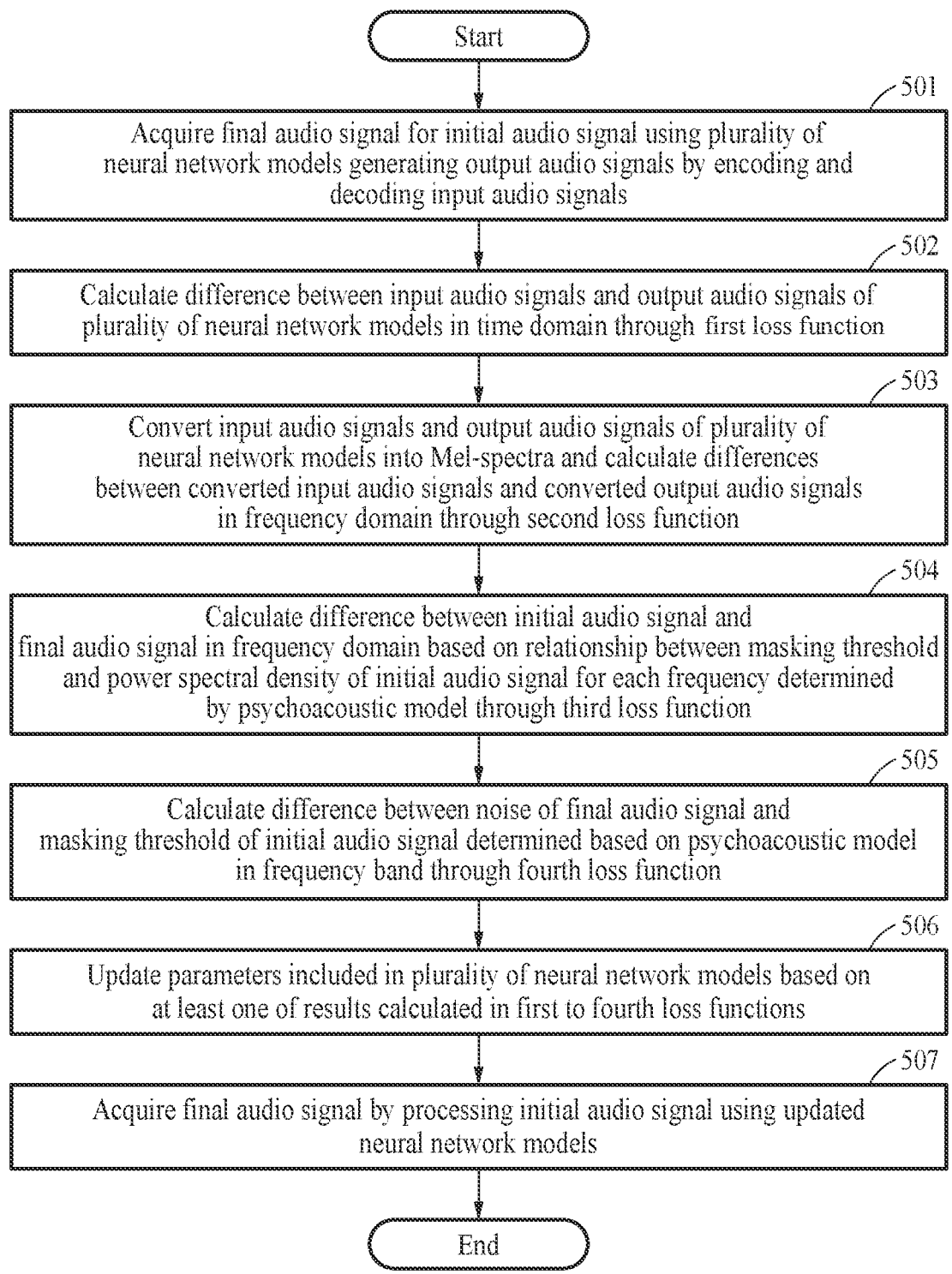
FIG. 5 is a flowchart illustrating an audio signal processing method according to an example embodiment of the present disclosure.

FIG. 5 is a flowchart illustrating an audio signal processing method according to an example embodiment of the present disclosure.

In operation 501, a processing apparatus acquires a final audio signal for an initial audio signal using a plurality of neural network models generating output audio signals by encoding and decoding input audio signals.

In this instance, the plurality of neural network models 102 through 104 is in a consecutive relationship. For example, an i-th neural network model generates an output audio signal using, as an input audio signal, a difference between an output audio signal of an (i−1)-th neural network model and an input audio signal of the (i−1)-th neural network model.

In operation 502, the processing apparatus may calculate a difference between the initial audio signal and the final audio signal for a time domain by inputting differences between the input audio signals and the output audio signals of the neural network models into a first loss function.

In operation 503, the processing apparatus may calculate a difference between the initial audio signal and the final audio signal for a frequency domain by inputting differences between Mel-spectra between the input audio signals and the output audio signals of the neural network models into a second loss function.

In operation 504, the processing apparatus acquires a masking threshold and a power spectral density for the initial audio signal through a psychoacoustic model to use a third loss function.

In addition, the processing apparatus determines a weight based on a relationship between the masking threshold and the power spectral density for each frequency through the third loss function and calculates a difference between a power spectral density of the initial audio signal and a power spectral density of the final audio signal for each frequency based on the determined weight.

In operation 505, the processing apparatus identifies noise generated in an encoding and decoding process of the initial audio signal from the final audio signal and calculates a difference between noise included in the final audio signal and the masking threshold for each frequency through a fourth loss function as shown in Equation 6.

In operation 506, the processing apparatus may train a neural network model to minimize a result of at least one loss function among the first to fourth loss functions. Specifically, the processing apparatus may update parameters included in the plurality of neural network models such that a difference between the initial audio signal and the final audio signal calculated through at least one loss function among the first to fourth loss functions is minimized.

For example, the processing apparatus may determine a difference between the initial audio signal and the final audio signal using only the first and second loss functions, determine a difference between the initial audio signal and the final audio signal using only the third loss function, determine a difference between the initial audio signal and the final audio signal using only the fourth loss function, and determine a difference between the initial audio signal and the final audio signal using all the first to fourth loss functions.

In operation 507, the processing apparatus may generate a final audio signal by processing the initial audio signal using the plurality of neural network models updated.

Figure 6:
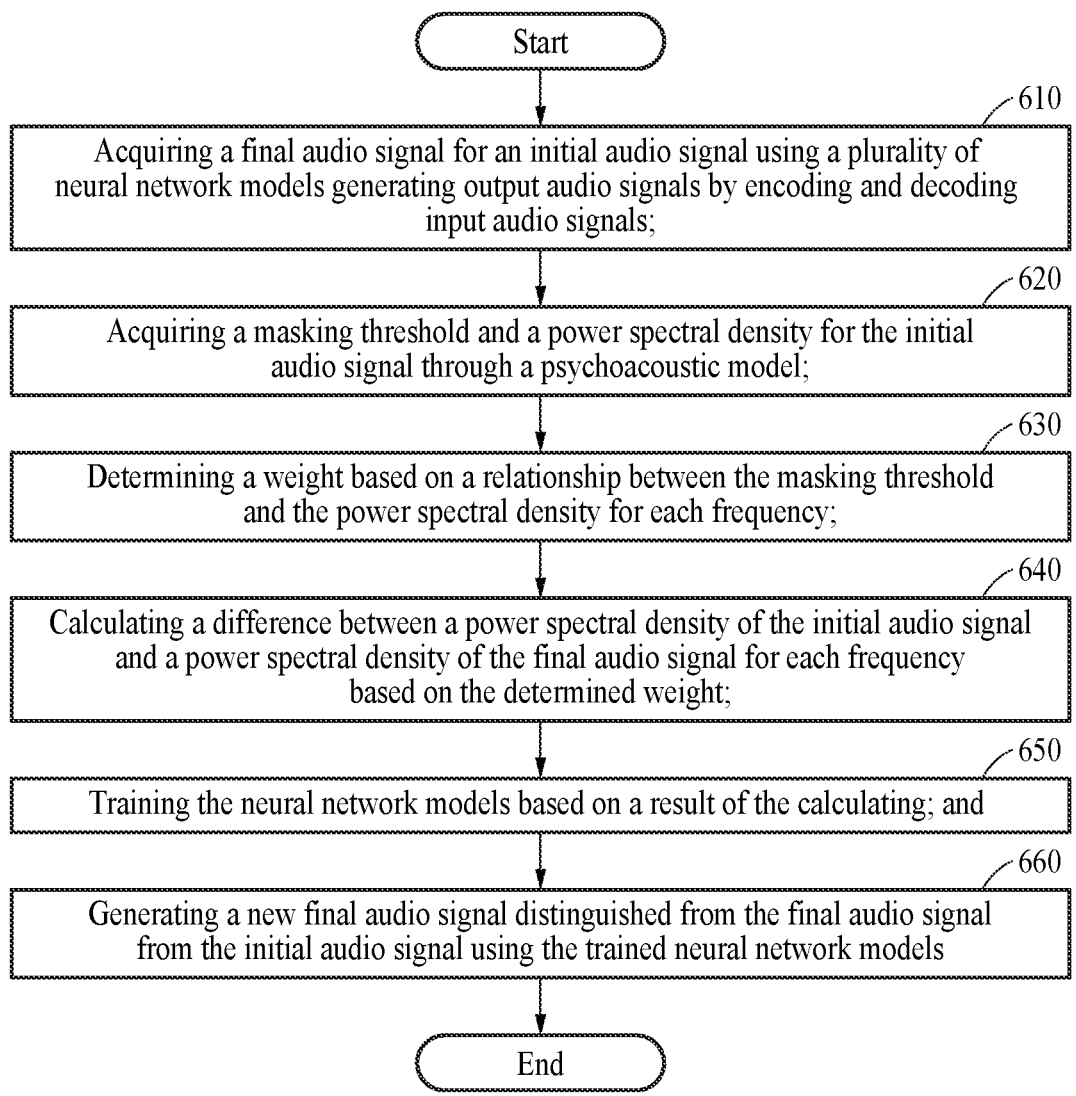
FIG. 6 is a flowchart illustrating an audio signal processing method according to an example embodiment of the present disclosure.

FIG. 6 is a flowchart illustrating an audio signal processing method according to an example embodiment of the present disclosure.

In operation 610, a processing apparatus may acquire a final audio signal for an initial audio signal using a plurality of neural networg models generating output audio signals by encoding and decoding input audio signals.

In operation 620, the processing apparatus may acquire a masking threshold and a power spectral density for the initial audio signal through a psychoacoustic model.

In operation 630, the processing apparatus may determine a weight based on a relationship between the masking threshold and the power spectral density for each frequency.

In operation 640, the processing apparatus may calculate a difference between a power spectral density of the initial audio signal and a power spectral density of the final audio signal for each frequency based on the determined weight.

In operation 650, the processing apparatus may train the neural network models based on a result of the calculating.

In operation 660, the processing apparatus may generate a new final audio signal distinguished from the final audio signal from the initial audio signal using the trained neural network models.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The optical access network system for slice connection or a slice connection network of an optical access network according to the present disclosure may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A processing method comprising:
   acquiring a final audio signal for an initial audio signal using a plurality of neural network models generating output audio signals by encoding and decoding input audio signals;
   acquiring a masking threshold and a power spectral density for the initial audio signal through a psychoacoustic model;
   determining a weight based on a relationship between the masking threshold and the power spectral density for each frequency;
   calculating a difference between a power spectral density of the initial audio signal and a power spectral density of the final audio signal for each frequency based on the determined weight;
   training the neural network models based on a result of the calculating; and
   generating a new final audio signal distinguished from the final audio signal from the initial audio signal using the trained neural network models,
   wherein the plurality of neural networks is in a consecutive relationship, where an i-th neural network model generates an output audio signal using, as an input audio signal, a difference between an output audio signal of an (i−1)-th neural network model and an input audio signal of the (i−1)-th neural network model
   wherein the masking threshold is a criterion for masking noise generated in an encoding and decoding process of the plurality of neural network models, respectively.

2. The processing method of claim 1, wherein the training of the neural network models comprises updating parameters included in the neural network models such that the result of the calculating is minimized.

3. The processing method of claim 1, wherein the determining of the weight comprises:
   determining the weight to be higher at a specific frequency as the power spectral density of the initial audio signal compared to the masking threshold increases, and determining the weight to the lower at the specific frequency as the masking threshold compared to the power spectral density of the initial audio signal increases.

* * * * *